United States Patent
Kim

(10) Patent No.: US 10,363,936 B2
(45) Date of Patent: Jul. 30, 2019

(54) VEHICLE CONTROL APPARATUS AND METHOD

(71) Applicant: MANDO CORPORATION, Gyeonggi-do (KR)

(72) Inventor: Deok-Ju Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/258,928

(22) Filed: Sep. 7, 2016

(65) Prior Publication Data
US 2017/0072964 A1    Mar. 16, 2017

(30) Foreign Application Priority Data
Sep. 11, 2015  (KR) .................. 10-2015-0128998

(51) Int. Cl.
*B60W 30/18* (2012.01)
*B60W 40/12* (2012.01)
*B60W 50/00* (2006.01)

(52) U.S. Cl.
CPC ...... *B60W 30/18172* (2013.01); *B60W 40/12* (2013.01); *B60W 50/0098* (2013.01); *B60W 2050/0088* (2013.01); *B60W 2420/42* (2013.01); *B60W 2520/10* (2013.01); *B60W 2520/28* (2013.01); *B60W 2720/10* (2013.01); *B60W 2900/00* (2013.01)

(58) Field of Classification Search
CPC .......... B60W 30/18172; B60W 40/12; B60W 50/0098; B60W 2050/0088
See application file for complete search history.

(56) References Cited

U.S. PATENT DOCUMENTS

| | | | |
|---|---|---|---|
| 2013/0124061 A1* | 5/2013 | Khanafer | G06F 17/00 701/70 |
| 2014/0222287 A1* | 8/2014 | Popham | B60G 17/0165 701/37 |
| 2015/0329045 A1* | 11/2015 | Harris | G06K 9/00805 348/148 |

FOREIGN PATENT DOCUMENTS

| | | |
|---|---|---|
| CN | 202294611 | 7/2012 |
| CN | 103465886 | 12/2013 |
| CN | 104527641 | 4/2015 |
| KR | 10-2005-0100990 | 10/2005 |

OTHER PUBLICATIONS

Office Action dated Oct. 23, 2018 for Chinese Patent Application No. 201610818432.2 and its English translation by Global Dossier.

* cited by examiner

*Primary Examiner* — Michael D Lang
(74) *Attorney, Agent, or Firm* — Ladas & Parry, LLP

(57) ABSTRACT

Vehicle control apparatus and method are disclosed. A method for controlling a vehicle control apparatus includes: measuring a vehicle speed to measure a first vehicle speed and a second vehicle speed of a vehicle, calculating an error rate to calculate an error rate of a vehicle speed using the first vehicle speed and the second vehicle speed measured in the measuring of the vehicle speed, and correcting a vehicle speed to correct a speed of the vehicle by calculating a third vehicle speed of the vehicle based on the error rate calculated in the calculating of the error rate.

20 Claims, 4 Drawing Sheets

VEHICLE CONTROL APPARATUS AND METHOD

CROSS-REFERENCE TO RELATED APPLICATION

This application claims the benefit of Korean Patent Application No. 2015-0128998, filed on Sep. 11, 2015 in the Korean Intellectual Property Office, the disclosure of which is incorporated herein by reference.

BACKGROUND

1. Field

Embodiments of the present disclosure relate to a vehicle control apparatus and a vehicle control method, and more particularly, to a vehicle control apparatus and method for correcting a vehicle speed and determining a wheel abnormality using image information.

2. Description of the Related Art

As engine performance of vehicles increases, traveling speeds of vehicles have increased. Accordingly, various electronic control systems (ECSs) are installed in vehicles for improving running stability and obtaining braking stability.

An ECS includes an anti-lock brake system (hereinafter, referred to as an ABS) which prevents slip of wheels during braking, a traction control system (hereinafter, referred to as a TCS) which prevents slip of wheels during sudden unexpected acceleration, and an electronic stability control (hereinafter, referred to as an ESC) in which the ABS and TCS are mixed to stably maintain a running posture of a vehicle, and the like.

Such an ECS uses a wheel speed sensor which measures a speed of a running vehicle for implementing appropriate control performance.

The wheel speed sensor measures the speed of the vehicle through a period of a pulse signal generated when a tone wheel installed at a wheel and configured to rotate with the wheel rotates. The tone wheel has a plurality of teeth or holes formed on a circular plate or a cylindrical shape through which light passes, and pulses are generated using a difference between when the light passes through the teeth or holes and when it does not pass through the teeth or holes. In the case of a vehicle, a rotational speed of a wheel, that is, a speed of the vehicle, is measured through the pulse signal.

However, such a wheel speed sensor has an inconvenience in that a speed of a vehicle is measured differently from an actual speed of the vehicle when a wheel of the vehicle is broken or replaced with another wheel, a pressure of a tire installed at the wheel is high or low compared with its normal state, or the tire is broken.

PRIOR ART

Patent Document

Korean Laid-Open Patent Publication No. 10-2005-0100990

SUMMARY

Therefore, it is an aspect of the present disclosure to provide a vehicle control apparatus and method for correcting a vehicle speed using image information.

In addition, it is another aspect of the present disclosure to provide a vehicle control apparatus and method for determining a wheel abnormality using image information.

Additional aspects of the disclosure will be set forth in part in the description which follows and, in part, will be obvious from the description, or may be learned by practice of the disclosure.

In accordance with an aspect of the present invention, a vehicle control method includes: measuring a vehicle speed to measure a first vehicle speed and a second vehicle speed of a vehicle; calculating an error rate to calculate an error rate of a vehicle speed using the first vehicle speed and the second vehicle speed measured in the measuring of the vehicle speed; and correcting a vehicle speed to correct a speed of the vehicle by calculating a third vehicle speed of the vehicle based on the error rate calculated in the calculating of the error rate.

The method may further include: determining a wheel abnormality to determine a wheel abnormality of the vehicle by comparing the third vehicle speed calculated in the correcting of the vehicle speed with the first vehicle speed.

The first vehicle speed may be a speed of the vehicle measured by a wheel speed sensor, and the second vehicle speed may be a relative speed of an image captured by a camera with respect to the vehicle.

The error rate may be proportional to the sum of the first vehicle speed and the second vehicle speed and is inversely proportional to the first vehicle speed.

The third vehicle speed may be proportional to the first vehicle speed and a difference between a reference value and the error rate.

The second vehicle speed may be a relative speed with respect to the vehicle based on an increased number of occupied pixels of a portion of an image captured by a camera.

The second vehicle speed may be a relative speed with respect to the vehicle based on a degree of movement of occupied pixels of a portion of an image captured by a camera.

The method may further include: correcting the first vehicle speed using the calculated third vehicle speed.

The first vehicle speed may include each wheel speed; the calculating of the error rate may include calculating the error rate of the vehicle speed a plurality of times using each wheel speed included in the first vehicle speed and the second vehicle speed; and the calculating of the error rate may include calculating the third vehicle speed of the vehicle a plurality of times based on the plurality of error rates calculated in the calculating of the error rate.

In accordance with another aspect of the present invention, a vehicle control apparatus includes: a camera configured to capture a running image of a vehicle; a plurality of wheel speed sensors installed at each wheel of the vehicle; and a controller configured to correct a plurality of wheel speeds using the running image obtained by the camera and a detection result of the wheel speed sensors, wherein the controller includes: a relative speed calculator configured to calculate a relative speed of the vehicle using the running image captured by the camera; an error rate calculator configured to calculate an error rate of the wheel speed using the relative speed and each of the wheel speeds; and a vehicle speed corrector configured to correct each of the wheel speeds based on the error rate.

The controller may further include a wheel abnormality determination unit configured to respectively compare the wheel speeds detected by the plurality of wheel speed sensors and the corrected wheel speeds to determine a wheel abnormality.

The relative speed calculator may calculate the relative speed of the vehicle based on an increased number of occupied pixels of a portion of the image captured by the camera; the error rate calculator may calculate the error rate of the vehicle such that the error rate is proportional to a vehicle speed and the relative speed and inversely proportional to the vehicle speed; and the vehicle speed corrector may correct each of the wheel speeds based on a corrected vehicle speed proportional to the vehicle speed and a difference between a reference value and the error rate.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Embodiments described in this specification and configurations illustrated in drawings are only exemplary examples of the disclosed disclosure. The disclosure covers various modifications that can substitute for the embodiments herein and drawings at the time of filing of this application.

Hereinafter, a vehicle control apparatus for correcting a vehicle speed will be described in detail with reference to one embodiment of the present disclosure.

Figure 1:
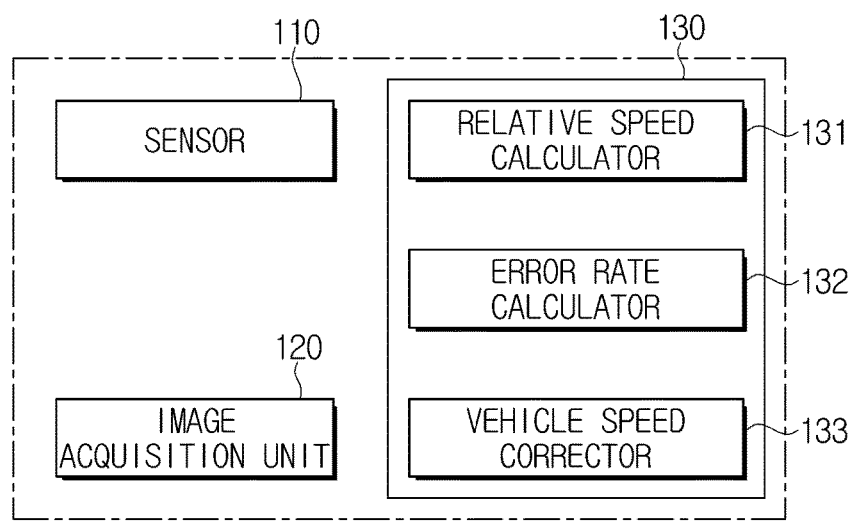
FIG. 1 is a block diagram illustrating a vehicle control apparatus according to an embodiment of the present invention.

As illustrated in FIG. 1, a vehicle control apparatus according to one embodiment of the present disclosure includes a sensor 110, an image acquisition unit 120, and a controller 130.

The sensor 110 detects a vehicle speed.

The sensor 110 may detect a wheel speed and transfer the detection result to the controller 130.

The sensor 110 may include a wheel speed sensor installed at a wheel to detect a wheel speed.

The wheel speed sensor may include a tone wheel installed at a wheel of a vehicle and configured to rotate with the wheel and a sensing unit that measures a period of a pulse signal generated when the tone wheel rotates.

The image acquisition unit 120 obtains a running image of a vehicle.

The image acquisition unit 120 may transfer the running image of the vehicle to the controller 130.

The image acquisition unit 120 may include a camera installed at the vehicle for obtaining the running image of the vehicle.

The camera may transfer the running image of the vehicle to the controller 130.

The camera may transfer the running image of the vehicle to the controller 130 with pixel information.

The pixel information may include the number of pixels included in one frame and relative distances between the pixels.

The camera may transfer information about time intervals between the frames to the controller 130.

A camera for a black box installed in a general vehicle may be used as the camera.

The controller 130 corrects a vehicle speed using a detection result detected by the sensor 110 and a running image obtained by the image acquisition unit 120.

The controller 130 includes a relative speed calculator 131, an error rate calculator 132, and a vehicle speed corrector 133.

The relative speed calculator 131 calculates a relative vehicle speed using a running image captured by the image acquisition unit 120.

The relative speed calculator 131 may calculate the relative vehicle speed using pixel information of the camera.

The relative speed calculator 131 may calculate the relative vehicle speed based on an increased or decreased number of occupied pixels of a portion of the running image of the camera.

The relative speed calculator 131 may calculate a relative vehicle speed based on an increasing number of occupied pixels when a running image of a camera is a front image, and may calculate the relative vehicle speed based on a decreasing number of occupied pixels when the running image of the camera is a rear image.

When a vehicle moves backward, the relative vehicle speed may be calculated based on the decreasing number of occupied pixels when the running image is the front image of the vehicle, and the relative vehicle speed may be calculated based on the increasing number of occupied pixels when the running image is the rear image of the vehicle.

The relative speed calculator 131 may determine whether a vehicle runs forward or backward based on a position of a running gear.

Figure 2:
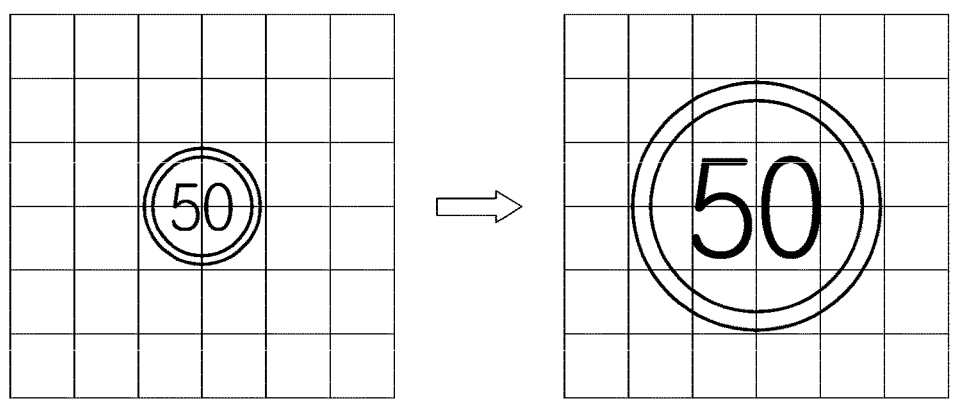
FIG. 2 illustrates a camera image to represent the increasing number of occupied pixels of a portion of the camera image according to an embodiment of the present invention.

As illustrated in FIG. 2, the relative speed calculator 131 may calculate the relative vehicle speed based on the increasing number of occupied pixels of a portion of a camera image.

The relative speed calculator 131 may calculate the relative vehicle speed using Equation 1.

$$\text{relative vehicle speed} = (\Delta \text{pixel}/\Delta t) \times K \qquad [\text{Equation 1}]$$

Δpixel: a degree of change of occupied pixels
Δt: time change
K: a camera-property-based tuning variable The camera-property-based tuning variable K is a fixed constant determined by specifications of a camera and a vehicle.

For example, when the number of occupied pixels of a sign board in a $100^{th}$ frame is 4, the number of pixels of the sign board in a $200^{th}$ frame is 16, a time interval of 100 frames is 0.1 sec, and the camera-property-based tuning variable K is 0.5, the relative vehicle speed is calculated as 60 m/s.

Here, since the relative vehicle speed is a relative vehicle speed with respect to an object rather than a speed of the vehicle itself, the relative vehicle speed has a negative value.

Figure 3:
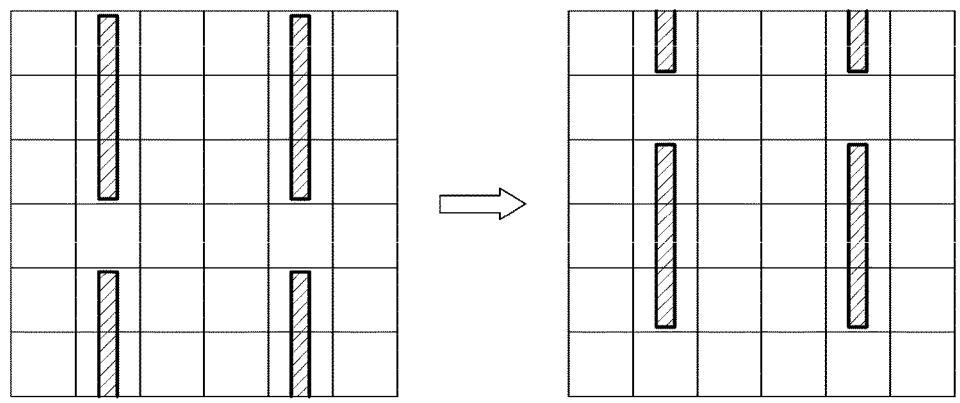
FIG. 3 illustrates a camera image to represent the degree of movement of occupied pixels of a portion of the camera image according to an embodiment of the present invention.

In addition, as illustrated in FIG. 3, the relative speed calculator 131 may measure the relative vehicle speed based on the degree of movement of occupied pixels of a portion of a camera image.

When the relative speed calculator 131 measures the relative vehicle speed based on the degree of movement of occupied pixels, Δpixel in Equation 1 is defined as the degree of movement of occupied pixels rather than the degree of change of occupied pixels.

When Δpixel in Equation 1 is defined as the degree of movement of occupied pixels rather than the degree of change of occupied pixels, the camera-property-based tuning variable K may also be adjusted.

For example, when the degree of movement of occupied pixels of a traffic lane in the $100^{th}$ and $120^{th}$ frames is 2, a time interval of 20 frames is 0.02 sec, and the camera-property-based tuning variable K is 0.6, a relative vehicle speed is calculated as 60 m/s.

The relative speed calculator 131 may be included in the image acquisition unit 120.

The error rate calculator 132 calculates an error rate of a vehicle speed using a relative speed and a vehicle speed.

The error rate calculator 132 may calculate an error rate of the vehicle speed using Equation 2.

$$\text{error rate} = (\text{relative speed} + \text{vehicle speed})/\text{vehicle speed} \quad \text{[Equation 2]}$$

For example, when the relative vehicle speed is −30 m/s and the vehicle speed is 20 m/s, the error rate is −0.5.

The vehicle speed corrector 133 corrects the vehicle speed based on the error rate.

The vehicle speed corrector 133 may correct the vehicle speed using Equation 3.

$$\text{corrected vehicle speed} = \text{vehicle speed} \times (1 - \text{error rate}) \quad \text{[Equation 3]}$$

For example, when the vehicle speed is 20 m/s and the error rate is −0.5, the corrected vehicle speed is 30 m/s.

As described above, since the vehicle speed is corrected using the relative vehicle speed, the vehicle speed may be accurately determined even when an abnormality occurs at the wheel speed sensor or the wheel.

Hereinafter, a vehicle control method for correcting a vehicle speed according to one embodiment of the present disclosure will be described in detail with reference to the accompanying drawings.

Figure 4:
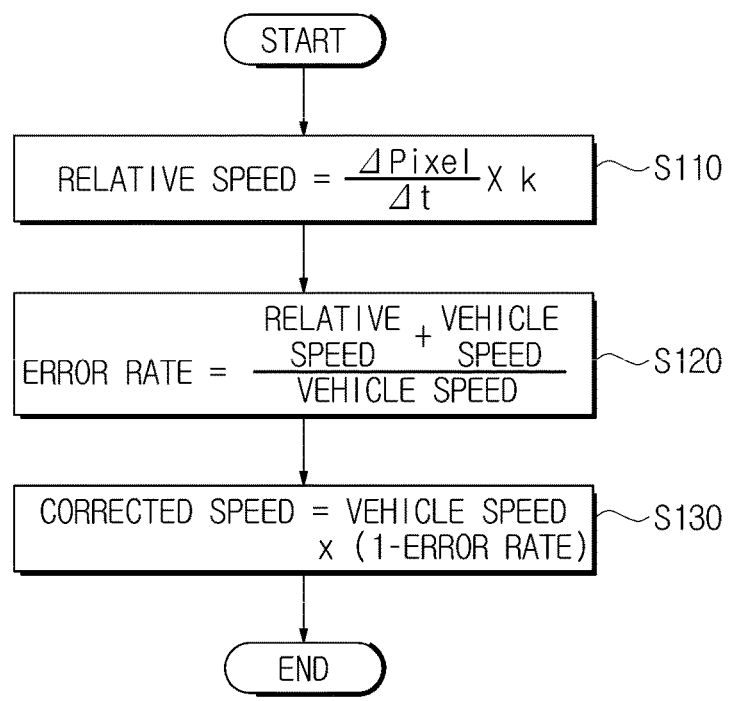
FIG. 4 is a flowchart illustrating a vehicle control method according to an embodiment of the present invention.

As illustrated in FIG. 4, a vehicle control method according to one embodiment of the present disclosure includes measuring a vehicle speed (S110), calculating an error rate (S120), and correcting a vehicle speed (S130).

In the measuring of the vehicle speed (S110), a first vehicle speed and a second vehicle speed of a vehicle are measured.

The first vehicle speed may be a vehicle speed measured by a wheel speed sensor, and the second vehicle speed may be provided as a relative speed of an image captured by a camera with respect to the vehicle.

The second vehicle speed may be provided as the relative speed with respect to the vehicle based on an increasing number of occupied pixels of a portion of the image captured by the camera.

The second vehicle speed may be provided as the relative speed with respect to the vehicle based on a degree of movement of occupied pixels of a portion of the image captured by the camera.

In the calculating of the error rate (S120), an error rate of a vehicle speed is calculated using the first vehicle speed and the second vehicle speed measured in the measuring of the vehicle speed (S110).

The error rate may be proportional to the sum of the first vehicle speed and the second vehicle speed and may be inversely proportional to the first vehicle speed.

In the correcting of the vehicle speed (S130), a third vehicle speed of the vehicle is calculated based on the error rate calculated in the calculating of the error rate (S120), and the vehicle speed is corrected.

The third vehicle speed may be provided to be proportional to the first vehicle speed and a difference between a reference value and the error rate.

The reference value may be set to 1.

Hereinafter, a vehicle control apparatus for detecting a wheel abnormality according to one embodiment of the present disclosure will be described in detail with reference to the accompanying drawings.

In addition, the vehicle control apparatus for detecting a wheel abnormality according to one embodiment of the present disclosure may be applied to a vehicle including at least one wheel, and hereinafter, the vehicle control apparatus applied to a general vehicle including four wheels will be described.

Figure 5:
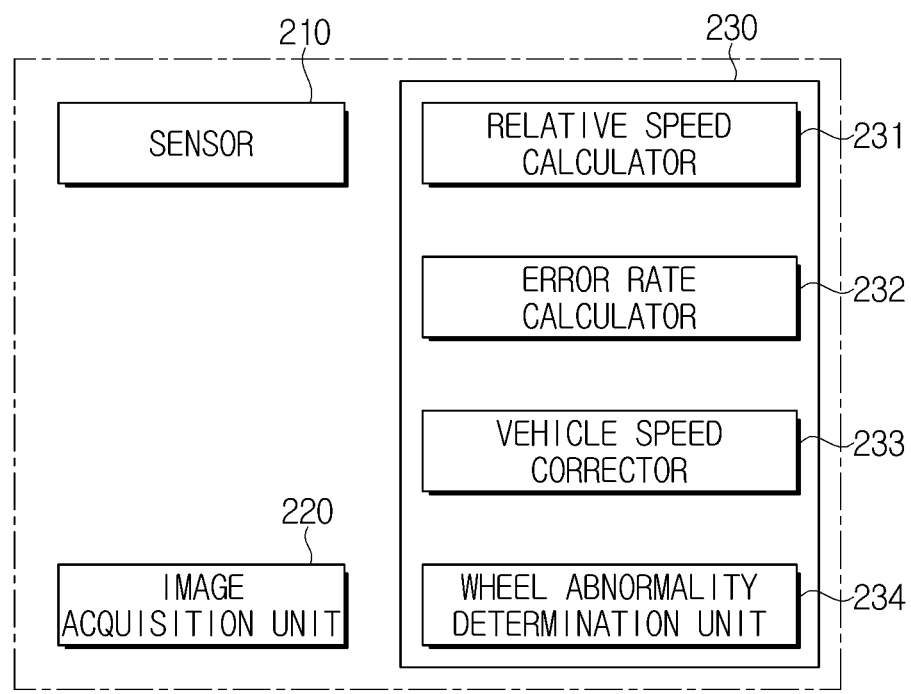
FIG. 5 is a block diagram illustrating a vehicle control apparatus according to an embodiment of the present invention.

As illustrated in FIG. 5, the vehicle control apparatus according to one embodiment of the present disclosure includes a sensor 210, an image acquisition unit 220, and a controller 230.

Because a structure and a function of the image acquisition unit 220 are the same as those of the above-described image acquisition unit 120, a detailed description thereof will be omitted.

The sensor 210 detects a vehicle speed.

The sensor 210 may detect a wheel speed and transfer the detection result to the controller 230.

The sensor 210 may include a plurality of wheel speed sensors installed each of wheels to detect wheel speeds.

Each of the plurality of wheel speed sensors may include a tone wheel installed at a wheel of the vehicle and configured to rotate with the wheel and a sensing unit that measures a period of a pulse signal generated when the tone wheel rotates.

The controller 230 includes a relative speed calculator 231, an error rate calculator 232, a wheel speed corrector 233, and a wheel abnormality determination unit 234.

Because a structure and a function of the relative speed calculator 231 are the same as those of the above-described relative speed calculator 131, a detailed description thereof will be omitted.

The error rate calculator 232 calculates an error rate of each of wheel speeds using a relative speed and each of the wheel speeds.

A plurality of error rates may be provided based on the wheel speeds.

The error rate calculator 232 may calculate the error rate of each of the wheel speeds using Equation 4.

$$\text{first error rate} = (\text{relative speed} + \text{first wheel speed})/\text{first wheel speed}$$

$$\text{second error rate} = (\text{relative speed} + \text{second wheel speed})/\text{second wheel speed}$$

$$\text{third error rate} = (\text{relative speed} + \text{third wheel speed})/\text{third wheel speed}$$

$$\text{fourth error rate} = (\text{relative speed} + \text{fourth wheel speed})/\text{fourth wheel speed} \quad \text{[Equation 4]}$$

For example, when the relative vehicle speed is −30 m/s, and the first wheel speed is 20 m/s, the first error rate is −0.5.

In addition, when the second wheel speed to the fourth wheel speed are 30 m/s, the second error rate to the fourth error rate is zero.

The wheel speed corrector 233 corrects a wheel speed based on the error rate.

A plurality of corrected wheel speeds may be provided based on the wheel speeds.

The wheel speed corrector 233 may correct the wheel speed using Equation 5.

first corrected wheel speed=first wheel speed×(1−first error rate)

second corrected wheel speed=second wheel speed× (1−second error rate)

third corrected wheel speed=third wheel speed×(1−third error rate)

fourth corrected wheel speed=fourth wheel speed× (1−fourth error rate)    [Equation 5]

For example, when the first wheel speed is 20 m/s and the first error rate is −0.5, the first corrected vehicle speed is 30 m/s.

In addition, when the second wheel speed to the fourth wheel speed are 30 m/s and the second error rate to the fourth error rate are zero, the second to fourth corrected vehicle speed is 30 m/s.

The wheel abnormality determination unit 234 compares each of the wheel speeds and each of the corrected wheel speeds and determines a wheel abnormality.

The wheel abnormality determination unit 234 may respectively compare the first wheel speed through the fourth wheel speed with the first corrected wheel speed through the fourth corrected wheel speed, and the wheel abnormality determination unit 234 may inform of an abnormality of the corresponding wheel when each difference between them is a reference value or more.

As described above, since each of the wheel speeds is corrected using each of the wheel speeds and the relative vehicle speed and each of the corrected wheel speeds is compared with each of the uncorrected wheel speeds, a wheel in which an abnormality occurs may be quickly and accurately determined.

Hereinafter, a vehicle control method for detecting a wheel abnormality according to one embodiment of the present disclosure will be described in detail with reference to the accompanying drawings.

Figure 6:
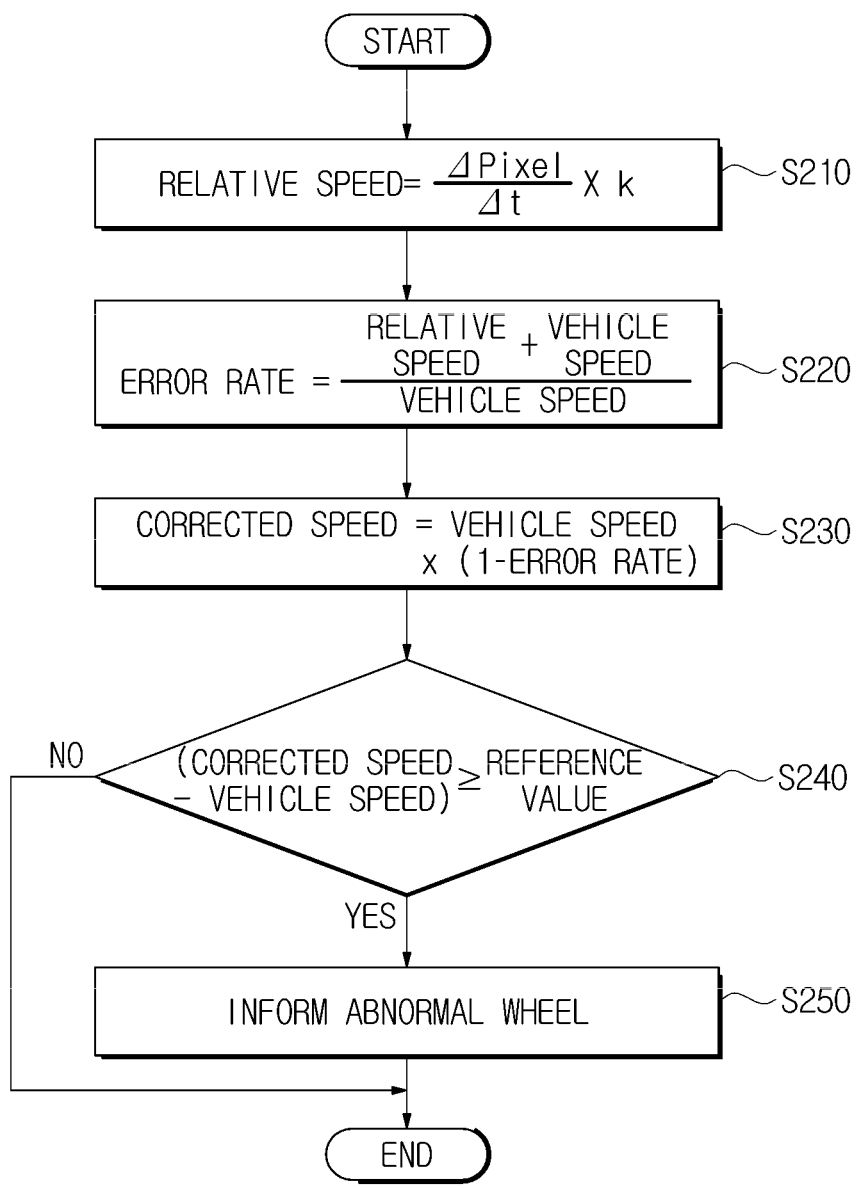
FIG. 6 is a flowchart illustrating a vehicle control method according to an embodiment of the present invention.

As illustrated in FIG. 6, a vehicle control method according to one embodiment of the present disclosure may include measuring a vehicle speed (S210), calculating an error rate (S220), correcting a wheel speed (S230), determining a wheel abnormality (S240), and informing a driver of an abnormal wheel (S250).

In the measuring of the vehicle speed (S210), a first vehicle speed and a second vehicle speed of a vehicle are measured.

The first vehicle speed may be a vehicle speed measured by a wheel speed sensor, and the second vehicle speed may be provided as a relative speed of a vehicle image captured by a camera with respect to the vehicle.

The second vehicle speed may be provided as the relative speed of the image captured by the camera with respect to the vehicle.

The second vehicle speed may be provided as the relative speed with respect to the vehicle based on an increasing number of occupied pixels of a portion of the image captured by the camera.

The second vehicle speed may be provided as the relative speed with respect to the vehicle based on a degree of movement of occupied pixels of a portion of the image captured by the camera.

In the calculating of the error rate (S220), an error rate of a vehicle speed is calculated using the first vehicle speed and the second vehicle speed measured in the measuring of the vehicle speed (S210).

In the calculating of the error rate (S220), the error rate of the vehicle speed may be calculated a plurality of times using each of the wheel speeds included in the first vehicle speed and the second vehicle speed.

The error rate may be proportional to the sum of the first vehicle speed and the second vehicle speed and may be inversely proportional to the first vehicle speed.

In the correcting of the vehicle speed (S230), a third vehicle speed of the vehicle is calculated based on the error rate calculated in the calculating of the error rate (S220) and the vehicle speed is corrected.

In the correcting of the vehicle speed (S230), the third vehicle speed may be calculated a plurality of times based on the plurality of error rates calculated in the calculating of the error rate (S220).

The third vehicle speed may be proportional to the first vehicle speed and a difference between a reference value and the error rate.

The reference value may be set to 1.

In the determining of the wheel abnormality (S240), the third vehicle speed calculated in the correcting of the vehicle speed (S230) and the first vehicle speed are compared and a wheel abnormality of the vehicle is determined.

In the determining of the wheel abnormality (S240), the plurality of third vehicle speeds calculated in the correcting of the vehicle speed (S230) and a plurality of first vehicle speeds are respectively compared and an abnormality of each wheel of the vehicle may be determined.

Accordingly, the correcting of the vehicle speed (S230) may further include correcting the first vehicle speed using the calculated third vehicle speed. In the determining of the wheel abnormality (S240), a wheel in which a difference between each of the plurality of third vehicle speeds calculated in the correcting of the vehicle speed (S230) and each of the plurality of first vehicle speeds is a reference value or more may be determined as an abnormal wheel.

In the informing the driver of the abnormal wheel (S250), the wheel in which an abnormality is discovered in the determining of the wheel abnormality (S240) is informed to a driver.

As is apparent from the above description, a vehicle control method in accordance with one embodiment of the present disclosure has an effect in that a vehicle speed can be accurately determined even when an abnormality occurs at a wheel because a first vehicle speed and a second vehicle speed of a vehicle are measured to correct the vehicle speed.

Although one embodiment of the present disclosure has been illustrated and described, the present disclosure may not be limited to the above-described specific embodiment and various changes may be made in the embodiment by those skilled in the art without departing from the scope and spirit of the present disclosure defined by the appended claims, and such modifications may not be individually understood from the present disclosure.

REFERENCE NUMERALS

110: SENSING UNIT
120: IMAGE ACQUISITION UNIT

130: CONTROLLER
131: RELATIVE SPEED CALCULATOR
132: ERROR RATE CALCULATOR
133: VEHICLE SPEED CORRECTOR

What is claimed is:

1. A vehicle control method comprising:
measuring, by a sensor, a first vehicle speed;
calculating a relative vehicle speed of an image captured by a camera with respect to a vehicle;
calculating an error rate of the measured first vehicle speed and the calculated relative vehicle speed; and
correcting a vehicle speed of the vehicle by calculating a second vehicle speed based on the error rate of the measured first vehicle speed and the calculated relative vehicle speed.

2. The vehicle control method of claim 1, further comprising determining a wheel abnormality of the vehicle by comparing the second vehicle speed calculated in the correcting of the vehicle speed with the first vehicle speed measured by the sensor.

3. The vehicle control method of claim 2, further comprising calculating an error rate of the measured first vehicle speed and the calculated relative vehicle speed, wherein:
the correcting the vehicle speed of the vehicle comprises correcting the vehicle speed of the vehicle based on the calculated error rate;
the first vehicle speed includes each wheel speed;
the calculating of the error rate includes calculating the error rate of the vehicle speed a plurality of times using each wheel speed included in the first vehicle speed and the relative vehicle speed; and
the correcting the vehicle speed of the vehicle includes calculating the second vehicle speed a plurality of times based on the plurality of error rates calculated in the calculating of the error rate.

4. The vehicle control method of claim 3, wherein the determining of the wheel abnormality includes determining an abnormality of each of the wheels of the vehicle by respectively comparing the plurality of second vehicle speeds calculated in the vehicle speed correction operation with the wheel speeds included in the first vehicle speed.

5. The vehicle control method of claim 1, wherein the error rate is proportional to the sum of the first vehicle speed and the relative vehicle speed and is inversely proportional to the first vehicle speed.

6. The vehicle control method of claim 1, wherein the second vehicle speed is proportional to the first vehicle speed and a difference between a reference value and the error rate.

7. The vehicle control method of claim 1, wherein the calculating the relative vehicle speed comprises calculating the relative vehicle speed using an increased number of occupied pixels of a portion of the image captured by the camera.

8. The vehicle control method of claim 1, wherein the calculating the relative vehicle speed comprises calculating the relative vehicle speed using a degree of movement of occupied pixels of a portion of the image captured by the camera.

9. The vehicle control method of claim 1, wherein the calculating the relative vehicle speed comprises calculating the relative vehicle speed using a differential number of occupied pixels of a portion of the image captured by the camera.

10. A vehicle control apparatus comprising:
a camera configured to capture a running image of a vehicle;
one or more speed sensors configured to measure a vehicle speed; and
a controller configured to calculate a relative vehicle speed of the running image captured by the camera with respect to a vehicle, to calculate an error rate of the vehicle speed measured by the one or more speed sensors and the calculated relative vehicle speed and to correct one or more vehicle speeds using the error rate of the vehicle speed measured by the one or more speed sensors and the calculated relative vehicle speed.

11. The vehicle control apparatus of claim 10, wherein:
the vehicle speeds comprise the one or more wheel speeds
the one or more speed sensors are configured to measure the one or more wheel speeds, and
the controller is configured to respectively compare the wheel speeds detected by the speed sensors and the corrected wheel speeds to determine a wheel abnormality.

12. The vehicle control apparatus of claim 10, wherein:
the controller is configured to calculate the relative vehicle speed based on an increased number of occupied pixels of a portion of the image captured by the camera.

13. The vehicle control apparatus of claim 10, wherein the error rate is proportional to the sum of the vehicle speed measured by the one or more speed sensors and the calculated relative vehicle speed and is inversely proportional to the vehicle speed measured by the one or more speed sensors.

14. The vehicle control apparatus of claim 10, wherein the corrected vehicle speed is proportional to the vehicle speed measured by the one or more speed sensors and a difference between a reference value and the error rate.

15. The vehicle control apparatus of claim 10, wherein the controller is configured to calculate the relative vehicle speed with respect to the vehicle based on a degree of movement of occupied pixels of a portion of the image captured by the camera.

16. The vehicle control apparatus of claim 10, wherein the one or more speed sensors are installed at each wheel of the vehicle.

17. The vehicle control apparatus of claim 10, wherein the controller is configured to calculate the relative vehicle speed using a differential number of occupied pixels of a portion of the image captured by the camera.

18. A vehicle control method comprising:
measuring a vehicle speed to measure a first vehicle speed and a second vehicle speed of a vehicle;
calculating an error rate of a vehicle speed using the first vehicle speed and the second vehicle speed measured in the measuring of the vehicle speed; and
correcting a vehicle speed to correct a speed of the vehicle by calculating a third vehicle speed of the vehicle based on the error rate calculated in the calculating of the error rate.

19. The vehicle control method of claim 18, further comprising determining a wheel abnormality to determine a wheel abnormality of the vehicle by comparing the third vehicle speed calculated in the correcting of the vehicle speed with the first vehicle speed.

20. The vehicle control method of claim 18, wherein the error rate is proportional to the sum of the first vehicle speed and the second vehicle speed and is inversely proportional to the first vehicle speed.

* * * * *